(12) United States Patent
Dobashi et al.

(10) Patent No.: US 8,267,132 B2
(45) Date of Patent: Sep. 18, 2012

(54) PNEUMATIC TIRE

(75) Inventors: Kensuke Dobashi, Kodaira (JP);
Toshiyuki Ishiguro, Tokorozawa (JP);
Sotaro Iwabuchi, Kodaira (JP); Shungo Fujita, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 122 days.

(21) Appl. No.: 12/682,527

(22) PCT Filed: Sep. 29, 2008

(86) PCT No.: PCT/JP2008/067668
§ 371 (c)(1),
(2), (4) Date: Apr. 9, 2010

(87) PCT Pub. No.: WO2009/047999
PCT Pub. Date: Apr. 16, 2009

(65) Prior Publication Data
US 2010/0224296 A1    Sep. 9, 2010

(30) Foreign Application Priority Data

Oct. 12, 2007 (JP) .................. 2007-266284
Nov. 27, 2007 (JP) .................. 2007-305809
Jun. 10, 2008 (JP) .................. 2008-151862

(51) Int. Cl.
*B60C 11/117* (2006.01)
*B60C 11/12* (2006.01)
(52) U.S. Cl. ......... 152/209.18; 152/209.13; 152/209.24; 152/209.8
(58) Field of Classification Search ............. 152/209.24, 152/209.28
See application file for complete search history.

(56) References Cited

U.S. PATENT DOCUMENTS

| 6,796,348 | B2 | 9/2004 | Ochi | |
| 7,543,617 | B2 | 6/2009 | Matsumoto | |
| 2001/0035245 | A1* | 11/2001 | Ikeda | 152/209.24 |
| 2002/0026972 | A1 | 3/2002 | Ochi | |

(Continued)

FOREIGN PATENT DOCUMENTS

EP    1 106 395 A2    6/2001

(Continued)

OTHER PUBLICATIONS

International Search Report for PCT/JP2008/067668, dated Dec. 16, 2008, 8 pages.

(Continued)

*Primary Examiner* — Richard Crispino
*Assistant Examiner* — Philip N Schwartz
(74) *Attorney, Agent, or Firm* — Sughrue Mion, PLLC

(57) ABSTRACT

There is provided a pneumatic tire sufficiently improving drainage performance, driving stability, uneven wear resistance and quiet performance. A pneumatic tire 1 has at least one tire circumferential groove 9 extending along the tire circumferential direction in a tread portion 2. In addition, there are provided in a surface of the tread portion, a plurality of inclined grooves consisting of two or more small grooves 10 inclined at the same direction with respect to the tire circumferential direction and having an inclination angle within a range between 10 degrees and 60 degrees and configured in a zig-zag manner by coupling ends of the small grooves 10.
The inclined grooves 11 are included in any widthwise section of the tread portion 2 of the tire and a part of the inclined grooves 11 is opened to the tire circumferential groove 9.

7 Claims, 10 Drawing Sheets

U.S. PATENT DOCUMENTS

| | | |
|---|---|---|
| 2006/0042738 A1 | 3/2006 | Matsumoto |
| 2007/0131324 A1 | 6/2007 | Fujita |
| 2007/0163692 A1 | 7/2007 | Miyasaka et al. |

FOREIGN PATENT DOCUMENTS

| | | |
|---|---|---|
| EP | 2 193 937 A1 | 6/2010 |
| JP | 6-199109 A | 7/1994 |
| JP | 2002-029224 A | 1/2002 |
| JP | 2004-345405 A | 12/2004 |
| JP | 2005-161921 A | 6/2005 |
| JP | 2005-162145 A | 6/2005 |
| JP | 2006-069305 A | 3/2006 |
| JP | 2007-161057 A | 6/2007 |
| JP | 2007-161114 A | 6/2007 |
| WO | 2004/103737 A1 | 12/2004 |
| WO | 2005/063507 A1 | 7/2005 |

OTHER PUBLICATIONS

Extended European Search Report issued in European Application No. 00838561.2-2425 / 2208622 dated Apr. 19, 2011 (6 pages).

Chinese Office Action issued May 18, 2012 for corresponding Chinese Application No. 200880116072.5.

* cited by examiner

PNEUMATIC TIRE

CROSS REFERENCE TO RELATED APPLICATIONS

This application is a National Stage of International Application No. PCT/JP2008/067668, filed Sep. 29, 2008, which claims priority from Japanese Patent Application Nos. 2007-266284 filed Oct. 12, 2007, 2007-305809 filed Nov. 27, 2007, and 2008-151862 filed Jun. 10, 2008, the contents of all of which are incorporated herein by reference in their entirety.

TECHNICAL FIELD

The present invention relates to a pneumatic tire comprising a tread portion provided with at least one tire circumferential groove extending along the tire circumferential direction, which intends to improve drainage performance, driving stability, uneven wear resistance and quiet performance.

RELATED ART

As a demand for improvement in tire performance is increased, various techniques have been proposed to simultaneously achieve plural performances such as driving stability, ride comfort, uneven wear resistance, drainage performance, quiet performance and the like, which have been thought to be contradicted with each other.

For example, JP2005161921A discloses a pneumatic tire, wherein a tread portion is sectioned by four tire circumferential grooves into a central land portion including a tire equatorial plane, shoulder land portions including tread edges and intermediate land portions between the central land portion and the shoulder land portion, a plurality of inclined grooves consisting of small grooves extending substantially in the tire circumferential direction and small grooves inclined with respect to the tire circumferential direction are provided in the intermediate land portions, and a part of such inclined grooves is opened to the tire circumferential groove. Since, in this pneumatic tire of JP2005161921A, a plurality of tire circumferential grooves are formed and small grooves extending substantially in the tire circumferential direction are formed in the intermediate land portions, water flowing on the tread portion when the tire is rolling under load agrees to the tire circumferential direction and therefore, drainage performance is improved. Since a part of such inclined grooves is opened to the tire circumferential groove, the intermediate land portion increases its stiffness so that driving stability is improved in comparison with a tire, in which an inclined groove connects two tire circumferential grooves. In addition, by providing a plurality of small grooves in the intermediate land portion, it is possible to optimize stiffness of the intermediate land portion and to improve driving stability and quiet performance.

JP2005162145A discloses a pneumatic tire, wherein a tread portion is sectioned by four tire circumferential grooves into a central land portion including a tire equatorial plane, shoulder land portions including tread edges and intermediate land portions between the central land portion and the shoulder land portion, a plurality of first inclined grooves extending from the tire circumferential groove located in the outermost side of a vehicle when the tire is mounted on the vehicle, across the tire equatorial plane to be opened to at least a tread edge are provided, each of the first inclined grooves comprises a narrow groove portion having a comparatively narrow groove width and a wide groove portion having a comparatively wide groove width, and an inclination angle of the first inclined groove with respect to the tire circumferential direction is gradually increased from the outside to the inside of the vehicle. The tire of JP2005162145A can secure minimum required drainage performance as a high-performance tire by providing a plurality of tire circumferential grooves, optimize stiffness of the land portions and improve driving stability both on a dry and wet road surface by forming three lines of land portions. In addition, by providing a plurality of inclined grooves, it is possible to efficiently drain water in the ground contact region of the tread to the inside of the vehicle and to improve drainage performance especially when the tire runs in a corner. In this case, a portion of the inclined groove, which has a significant impact especially on drainage performance, consists of a wide groove portion and a portion of the inclined groove, which has a significant impact especially on stiffness of land portions and road noise, consists of a narrow groove portion, so that drainage performance, driving stability and quiet performance are improved.

WO2004103737A1 discloses a pneumatic tire, wherein a groove portion as resonator, one end of which is opened to a tire circumferential groove and the other end of which terminates in a land portion is provided in a tread portion and at least a resonator is included in a ground contact surface when the tire is rolling under load. Since, in the tire of WO2004103737A1, at least a resonator always contacts the ground when the tire is rolling under load, air column resonance noise generated from tire circumferential groove is effectively reduced and quiet performance is improved. In addition, a negative ratio in the tread portion is increased by providing the resonator and drainage performance is improved.

DISCLOSURE OF THE INVENTION

Problems to be Solved by the Invention

Although, in the tire described in JP2005161921A or JP2005162145A, drainage performance, driving stability and quiet performance are improved, uneven wear of the tread portion is not sufficiently considered and the groove shape is deformed due to uneven wear, which may lead to deterioration of drainage performance, driving stability and quiet performance. Since, in the tire described in WO2004103737A1, the rib-shaped land portion has a substantially divided shape in order to sufficiently secure the length of the groove comprising a resonator, this land portion varies its stiffness with locations and the land portion has uneven stiffness, which may lead to deterioration of driving stability. Due to such difference in stiffness, when the rib-shaped land portion having different stiffness continuously contacts a road surface, vibration may be produced and driving stability and quiet performance may be deteriorated. Accordingly, a tire improving not only drainage performance, driving stability and quiet performance but also uneven wear resistance is expected. In addition, since a higher performance tire is expected, further improvement in drainage performance, driving stability and quiet performance are desired.

It is, therefore, an object of the present invention to provide a pneumatic tire further improving drainage performance, driving stability, uneven wear resistance and quiet performance by optimizing a shape of a tread portion.

Means for Solving the Problem

In order to achieve the above-mentioned object, a pneumatic tire according to the present invention comprises a tread portion provided with at least one tire circumferential groove extending along a tire circumferential direction, wherein a plurality of inclined grooves consisting of two or more small grooves inclined at a same direction with respect to the tire circumferential direction and having an inclination angle within a range between 10 degrees and 60 degrees are formed in a surface of the tread portion and configured in a zig-zag manner by coupling ends of the small grooves; two of the inclined grooves adjacent to each other in the circumferential direction are partially overlapped in the circumferential direction; and a part of the inclined grooves is opened to the tire circumferential groove. Since, in this tire, at least one tire circumferential groove is provided, each small groove extends in the same direction with the inclination angle between 10 degrees and 60 degrees and the inclined groove is folded, assuming that the inclined groove has the same groove width, a groove capacity per one inclined groove can be increased and drainage performance can be increased. Of course, it is possible to increase a groove capacity of the inclined grooves by increasing its groove width. However, if doing so, it is impossible to prevent uneven wear because stiffness varies greatly from a region of the tread portion provided with the inclined grooves to other regions of the tread portion. By partially overlapping adjacent inclined grooves in the circumferential direction, the inclined grooves will always contact a road surface in the tire circumferential direction when the tire is rolling under load and the inclined grooves always exist in the tread contact surface in the circumferential direction, so that stable drainage performance can be secured. Thanks to such an overlap of the inclined grooves, the difference in stiffness is hard to occur in a region where the inclined grooves are provided in comparison to a case where the inclined grooves intermittently contact a road surface. As a result, it is possible to restrain vibration when the tire is rolling under load due to such difference in stiffness, to improve quiet performance and driving stability and to restrain uneven wear. Furthermore, since a part of the inclined grooves is opened to the tire circumferential groove, water in the inclined grooves flows into the tire circumferential groove through the opening part and a cycle of absorption and drainage in the inclined groove is promoted so that it is possible to improve drainage performance. Since one end of the inclined groove is opened to the tire circumferential groove, this inclined groove can function as a resonator to reduce air column resonance noise generated from the tire circumferential groove. Since the inclined groove has a folding configuration, the inclined groove can be adjusted to have an appropriate capacity so that the inclined groove can function as a resonator having a capacity depending on the air column resonance noise generated from the tire circumferential groove. "Inclined at the same direction with respect to the tire circumferential direction" as used herein means that the small groove constituting the inclined groove satisfies the relationship that an acute angle formed by the tire circumferential direction and the small groove exists in the first and third quadrants or in the second and forth quadrants in Cartesian coordinates with the tire circumferential direction being an Y-axis and the tire widthwise direction being an X-axis. "Two of the inclined grooves adjacent to each other in the circumferential direction are partially overlapped in the circumferential direction" as used herein means a configuration that the inclined grooves are always included in any widthwise section of the tire.

It is preferable that the tread portion is provided with at least two tire circumferential grooves, a rib-shaped land portion is sectioned by the tire circumferential grooves, and the inclined grooves are formed in the rib-shaped land portion.

It is preferable that a mounting direction of the tire to a vehicle is designated in such a manner that the rib-shaped land portion is outside of the vehicle with respect to a tire equatorial plane when the tire is mounted on the vehicle.

It is preferable that the rib-shaped land portion has a width of not less than 20% of a width of the tread portion contacting a road surface. This "width of the rib-shaped land portion" as used herein means a distance of the rib-shaped land portion measured along periphery of the tread portion in the tire widthwise section under the condition that a tire is mounted on a standard rim (or "approved rim", recommended rim") in the application size described in the following standards, in a ground contacting state with the maximum load (maximum load capacity) of a single wheel in the application size described in the following standards and with air pressure corresponding to the maximum load. The "width of the tread portion contacting a road surface" as used herein means a distance of the tread portion which contacts a road surface in tire widthwise section measured along periphery of the tread portion in a ground contacting state under the similar condition. The standards are regulated by the industrial standards effective in areas where a tire is produced or used. For example, it is defined in "Year Book" of The Tire and Rim Association Inc. in the United States of America, "Standards Manual" of The European Tyre and Rim Technical Organisation in Europe and "JATMA Year Book" of THE Japan Automobile Tyre Manufacturers Association, Inc. in Japan.

It is preferable that the rib-shaped land portion has a negative ratio within a range between 20% and 40%.

It is preferable that the inclined grooves having different capacities are formed. "The inclined grooves having different capacities" as used herein means that capacities of at least two inclined grooves are different and that capacities of not more than all inclined grooves are different.

It is preferable that the inclined groove consists of a first small groove, a second small groove coupled to a first end of the first small groove and inclined at a smaller angle than an inclination angle of the first small groove with respect to the tire circumferential direction and a third small groove coupled to a second end of the first small groove and inclined at a smaller angle than the inclination angle of the first small groove with respect to the tire circumferential direction.

A portion of the inclined groove overlapped in the circumferential direction has a length in the tire circumferential direction preferably within a range between 10% and 150%, and more preferably within a range between 30% and 80% of a width of the rib-shaped land portion.

Effect of the Invention

According to the present invention, it is possible to provide a pneumatic tire further improving drainage performance, driving stability, uneven wear resistance and quiet performance by optimizing a shape of a tread portion.

DESCRIPTION OF REFERENCE NUMERALS

| | |
|---|---|
| 1 | tire |
| 2 | tread portion |
| 3 | side wall portion |
| 4 | bead portion |
| 5 | bead core |
| 6 | carcass |
| 7 | belt layer |
| 8 | inner liner |
| 9 | tire circumferential groove |
| 10 | small groove |
| 11 | inclined groove |
| 12 | first small groove |
| 13 | second small groove |
| 14 | third small groove |
| 15 | rib-shaped land portion |
| CL | tire equatorial plane |
| W1 | width of rib-shaped land portion |
| W2 | width of tread portion contacting road surface |
| K | part where inclined groove is opened to tire circumferential groove |

BEST MODE FOR CARRYING OUT THE INVENTION

Figure 1:
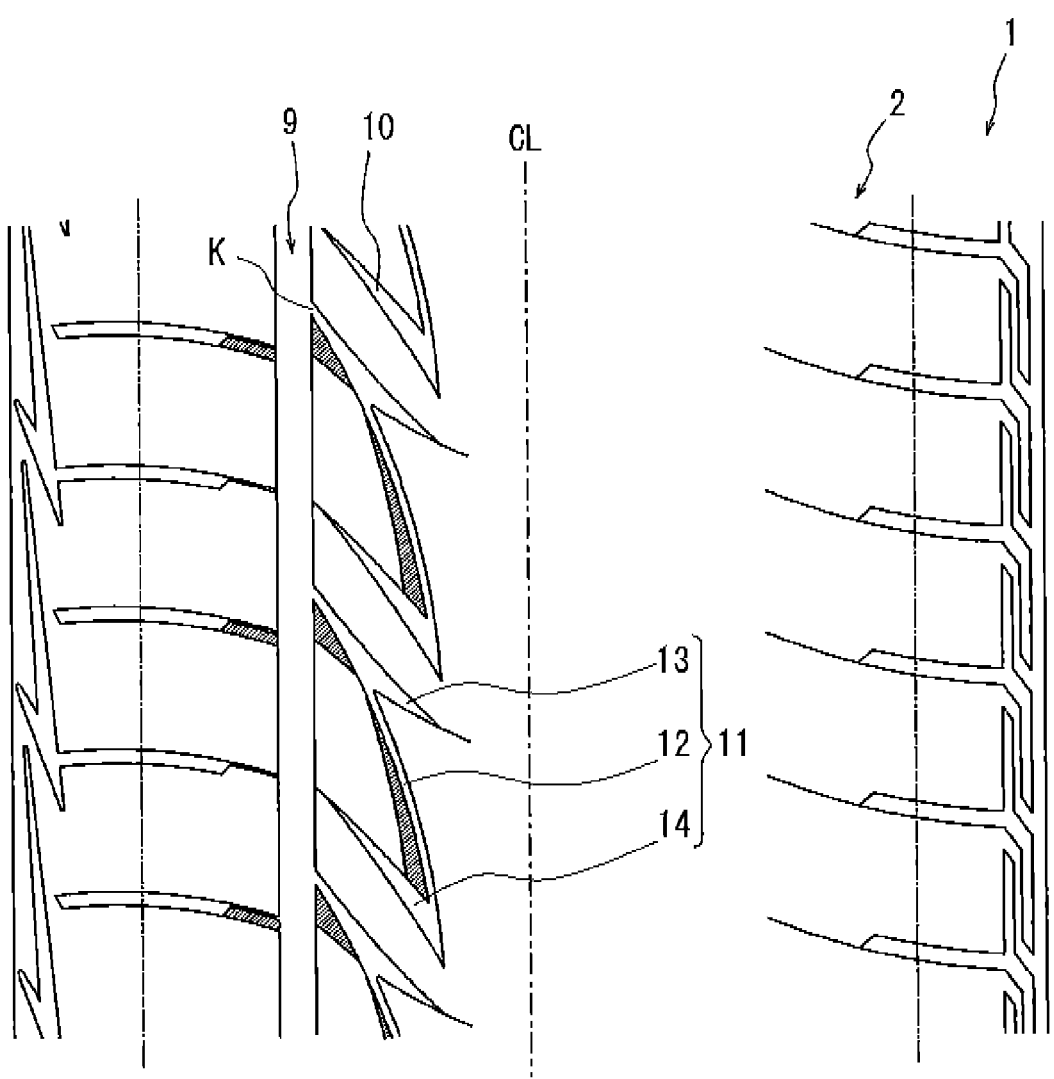
FIG. 1 is a partial development view of a tread portion of a typical tire according to the present invention.
Figure 2:
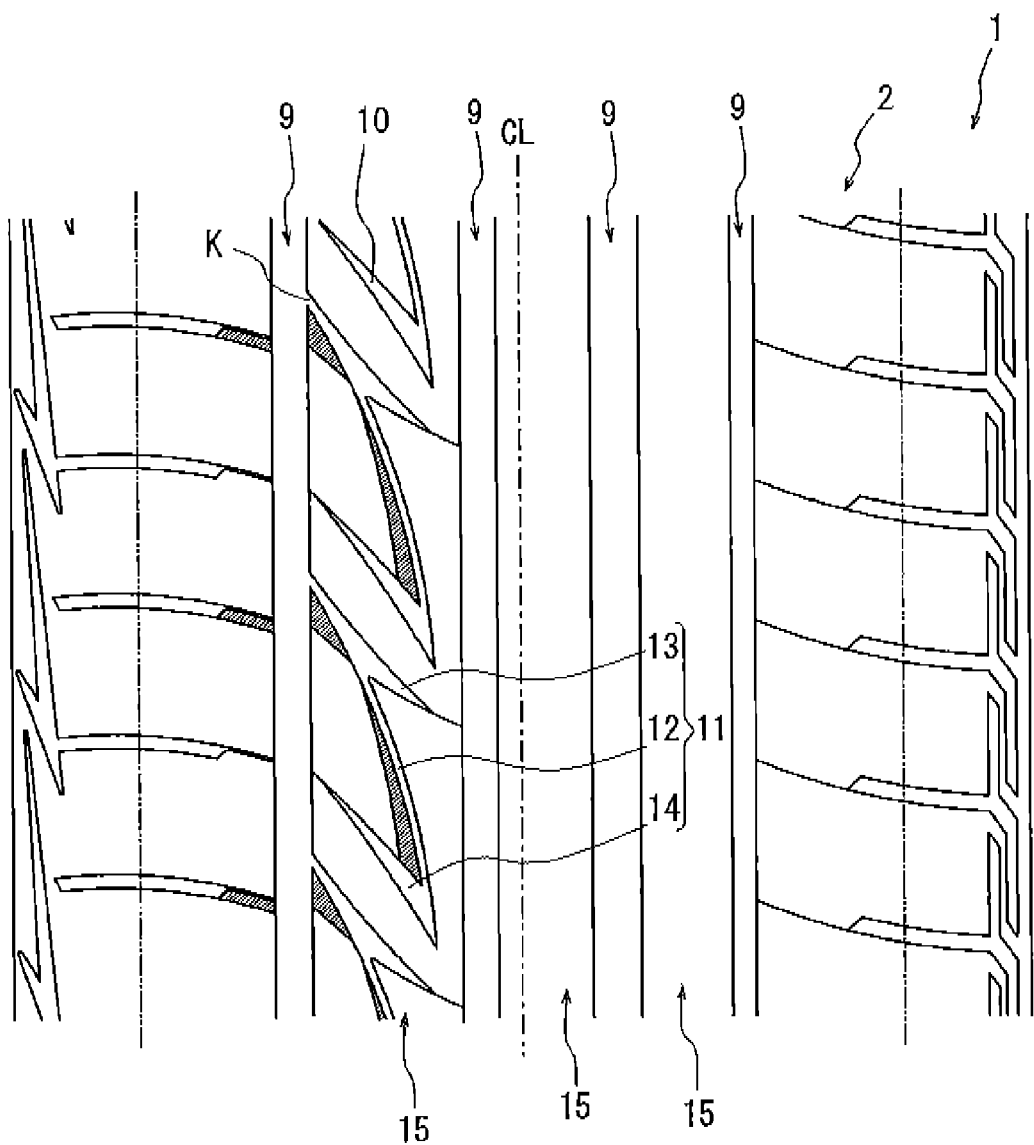
FIG. 2 is a partial development view of a tread portion of another tire according to the present invention.
Figure 3:
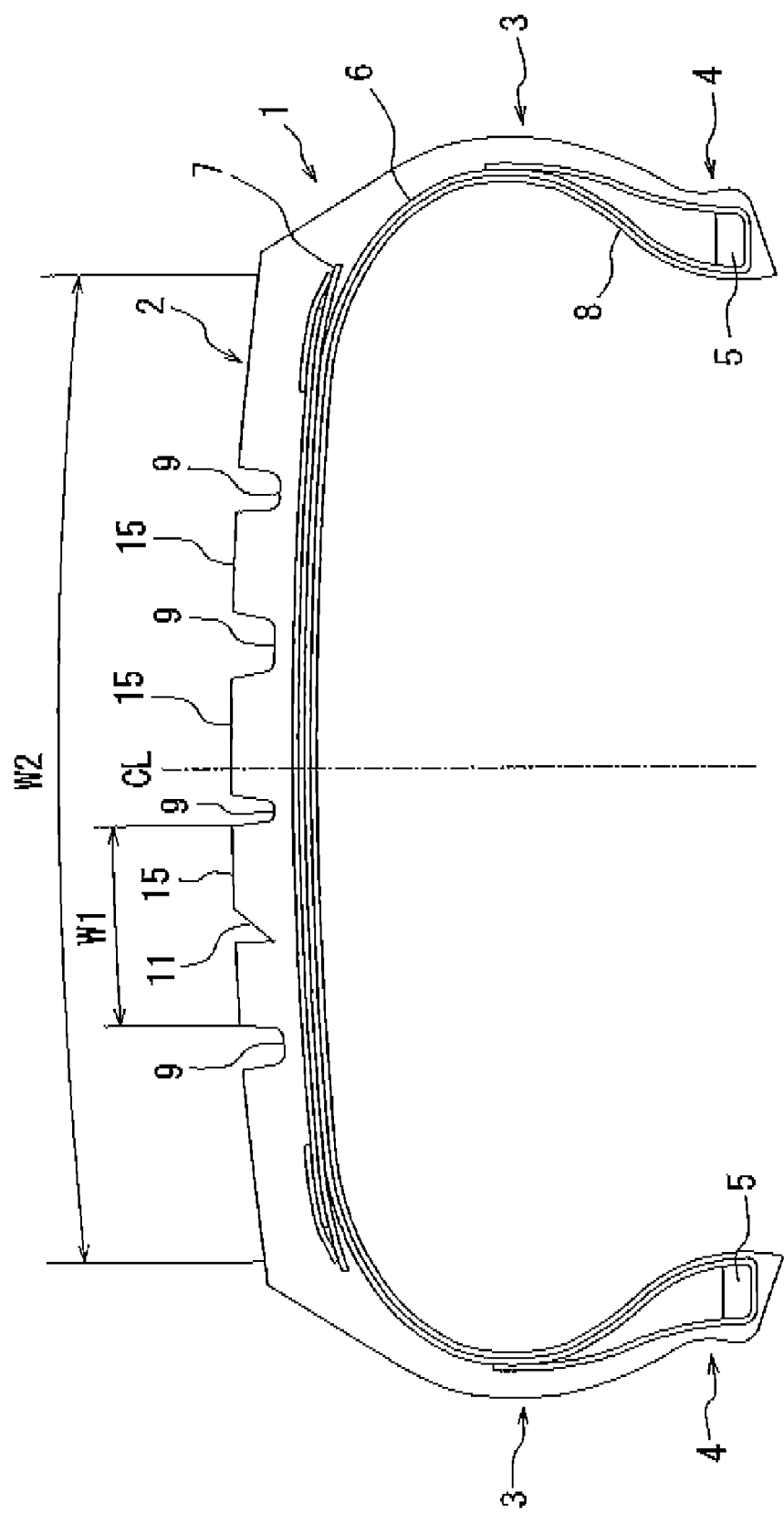
FIG. 3 is a sectional view in the tire widthwise direction of the tire shown in FIG. 2.
Figure 4:
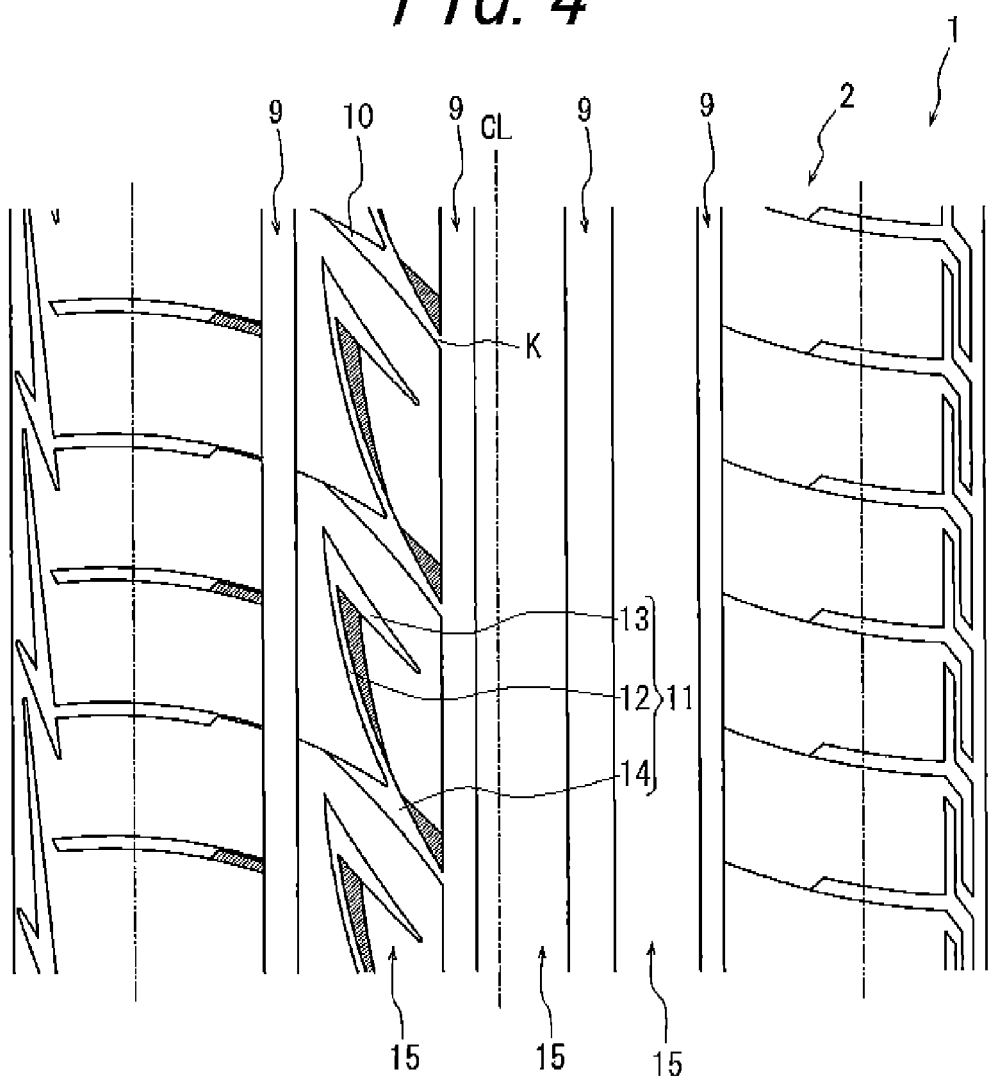
FIG. 4 is a partial development view of a tread portion of another tire according to the present invention.
Figure 5:
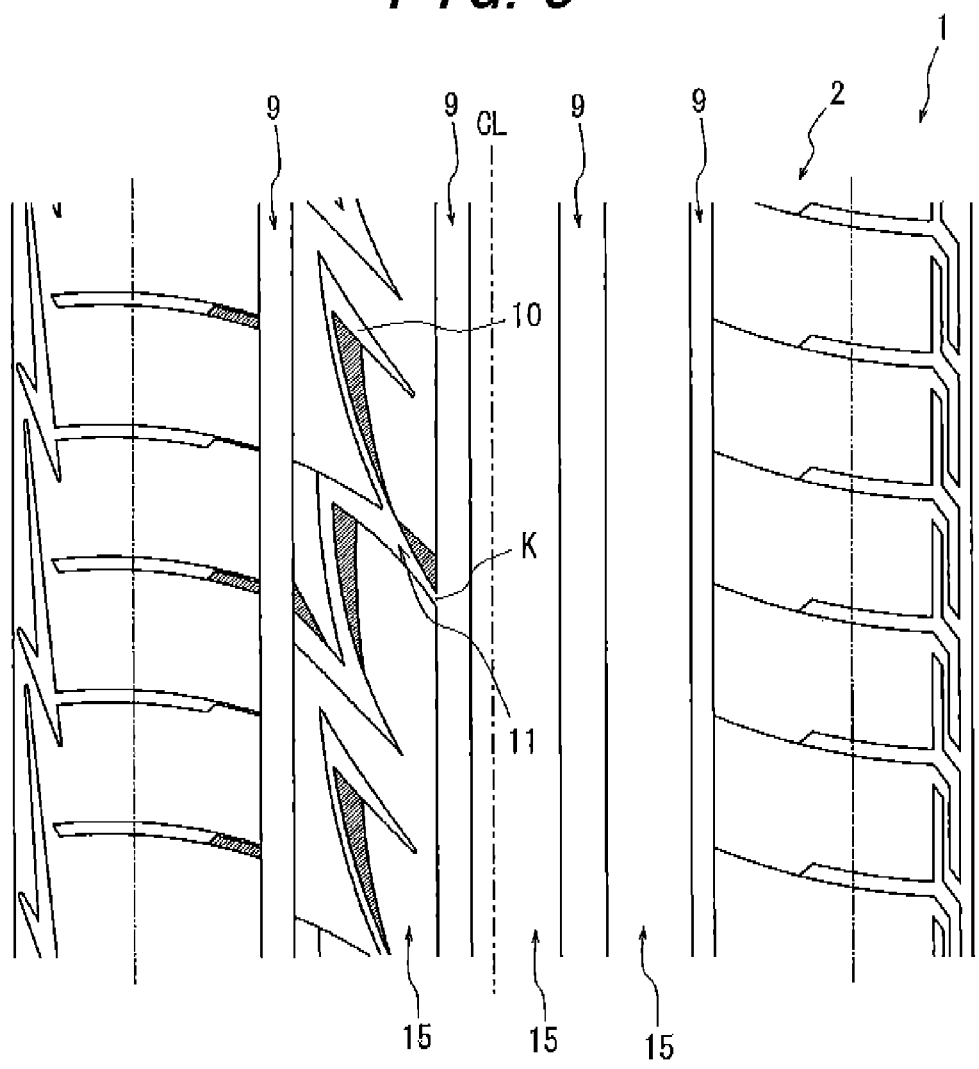
FIG. 5 is a partial development view of a tread portion of another tire according to the present invention.
Figure 6:
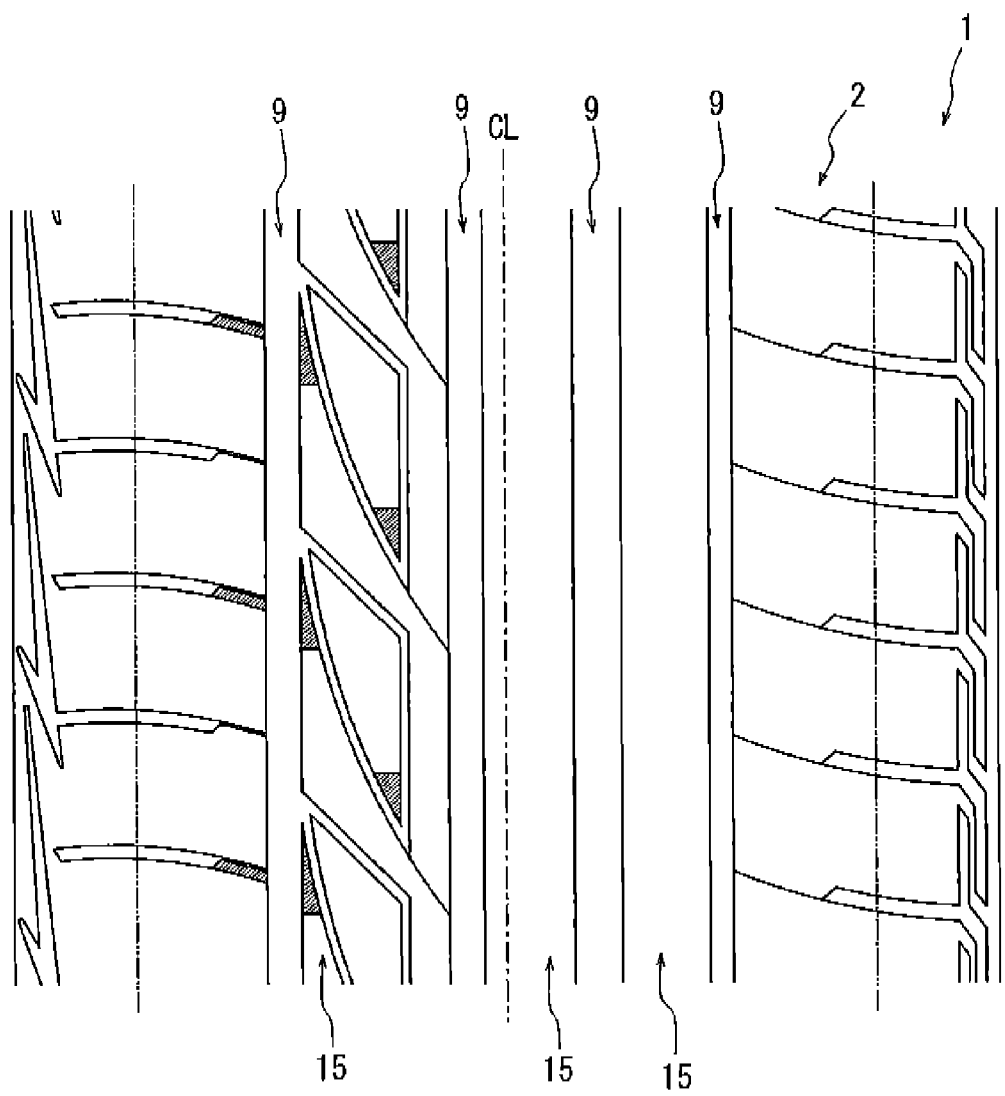
FIG. 6 is a partial development view of a tread portion of a conventional tire.
Figure 7:
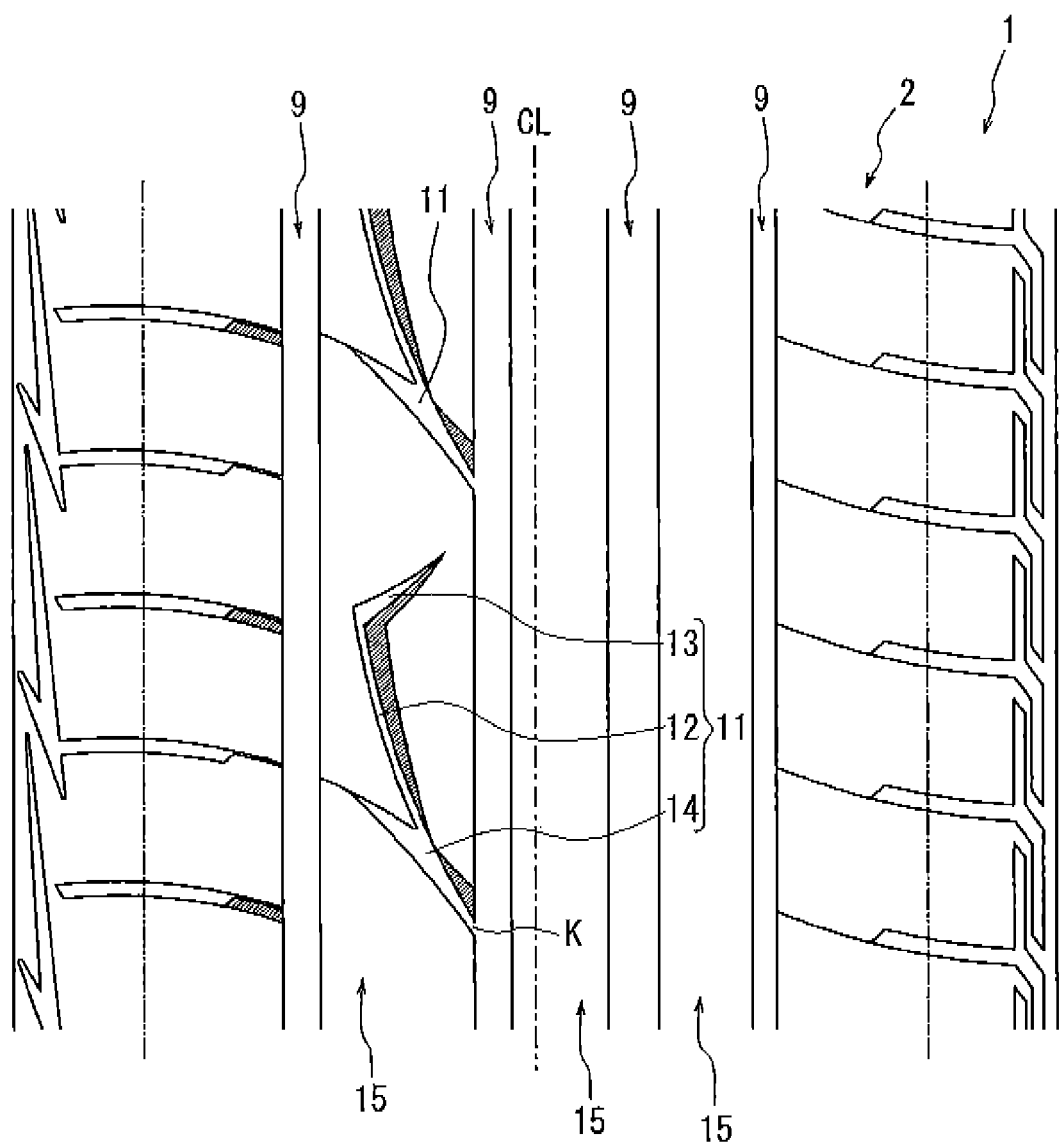
FIG. 7 is a partial development view of a tread portion of a comparative tire.
Figure 8:
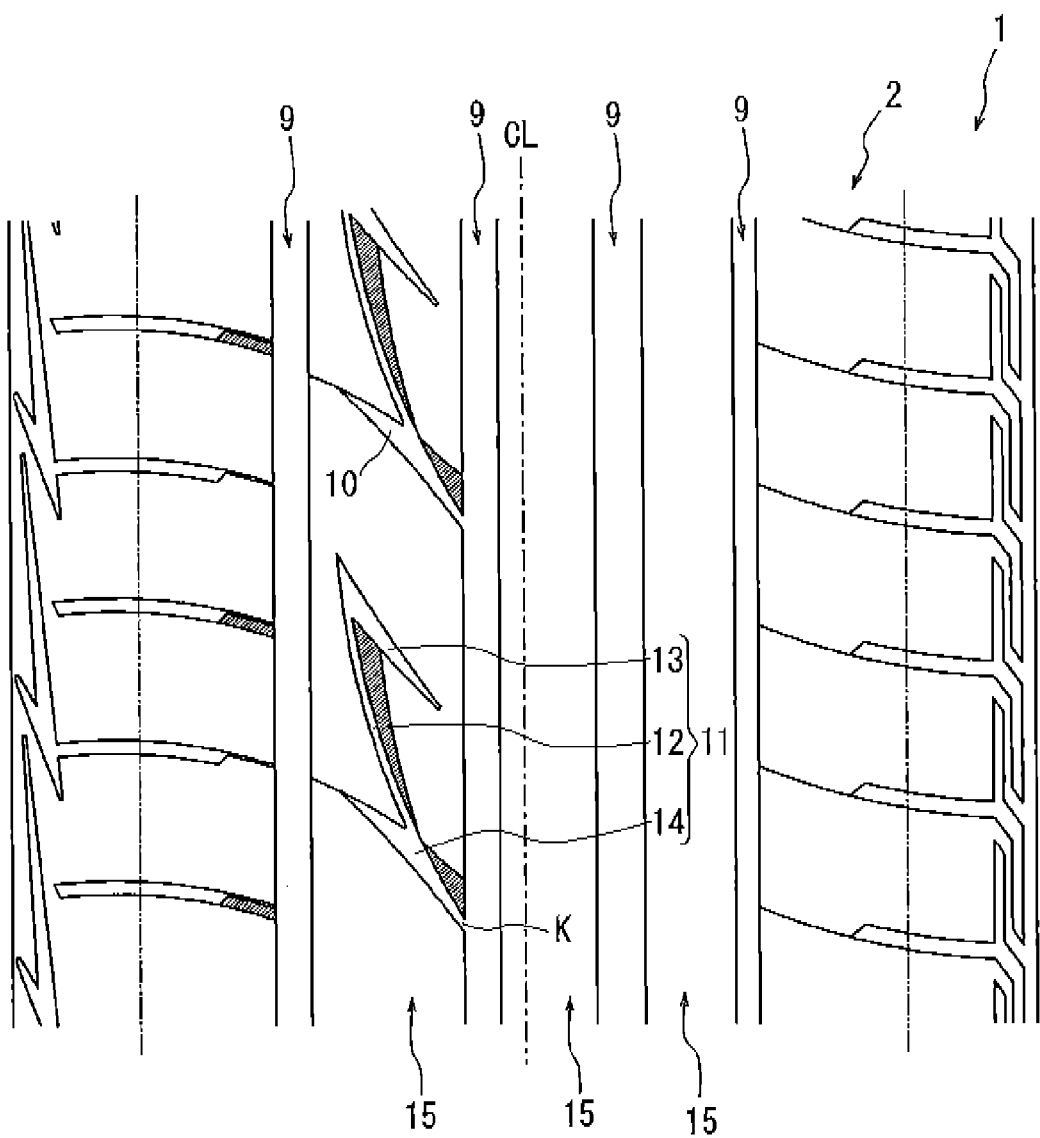
FIG. 8 is a partial development view of a tread portion of a comparative tire.
Figure 9:
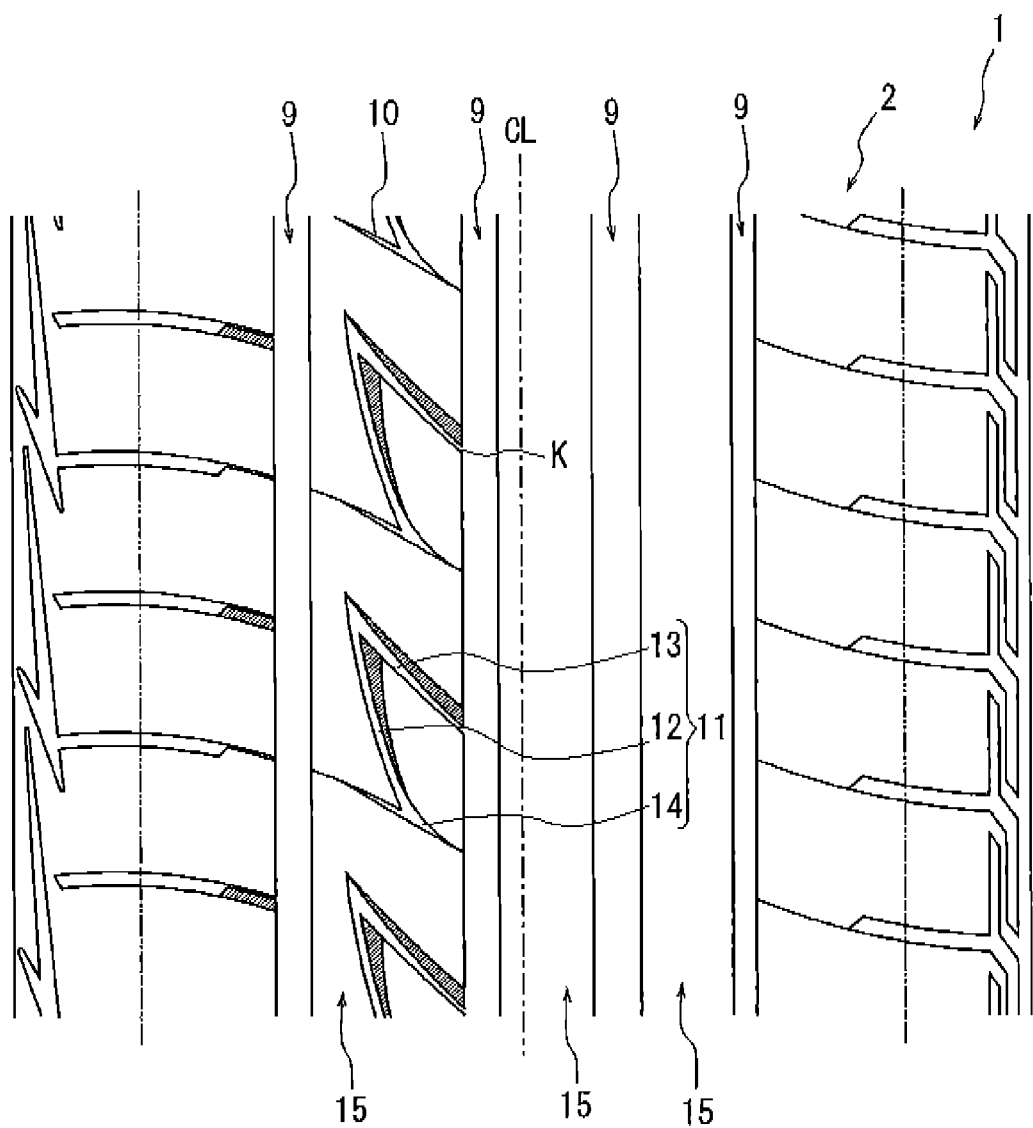
FIG. 9 is a partial development view of a tread portion of a comparative tire.

Hereinafter, embodiments of the present invention will be described with reference to drawings. FIG. 1 is a partial development view of a tread portion of a typical pneumatic tire (hereinafter referred to as "tire") according to the present invention. FIG. 2 is a partial development view of a tread portion of another tire according to the present invention. FIG. 3 is a sectional view of the tire shown in FIG. 2. FIGS. 4 and 5 are partial development views of a tread portion of another tire according to the present invention.

A tire 1 of this invention comprises a tread portion 2 contacting a road surface, a pair of side wall portions 3 extending from both ends of this tread portion 2 in the radially inner side of the tire and a pair of bead portions 4 disposed in the radially inner side of the side wall portions 3 and engaged in a rim according to the custom. There are provided in the inside of this tire 1, a carcass 6 toroidally extending between bead cores 5, 5, each of which is embedded in each of the bead portions 4, forming a frame structure of the tire, and having, for example, a radial structure, a belt layer 7 positioned in the outer peripheral side of a crown area of this carcass 6 and reinforcing the tread portion 2. An air-impermeable inner liner 8 is disposed in the internal side of the tire 1.

The tread portion 2 of the tire 1 according to this invention shown in FIG. 1 is provided with a tire circumferential groove 9 extending along the tire circumferential direction. A plurality of inclined grooves 11 consisting of three small grooves 10 (in FIG. 1 first to third small grooves 12-14) inclined at the same direction, that is, extending in a first quadrant and a third quadrant with respect to the tire circumferential direction and having an inclination angle within a range between 10 degrees and 60 degrees are formed in a surface of the tread portion 2 and configured in a zig-zag manner by coupling ends of the small grooves 10. Two of the inclined grooves 11 adjacent to each other in the circumferential direction are partially overlapped in the circumferential direction and a part of the inclined grooves 11 is opened to the tire circumferential groove 9. The "zig-zag manner" as used herein means that an angle formed by an end of a small groove 10 and an end of its adjacent small groove 10 is equal or less than 90 degrees, that is, an acute angle. Since, in this tire 1, a plurality of tire circumferential grooves 9 are provided, each small groove 10 extends in the same direction with the inclination angle between 10 degrees and 60 degrees and the inclined groove 11 is folded, assuming that the inclined groove has the same groove width, a groove capacity per one inclined groove can be increased and drainage performance can be increased. Of course, it is possible to increase a groove capacity by increasing a groove width. However, if doing so, it is impossible to prevent uneven wear because stiffness varies greatly from a region of the tread portion 2 provided with the inclined grooves 11 to other regions of the tread portion 2. On the contrary, for example, in case that the small groove 10 has an angle of less than 10 degrees, the inclined groove 11 is not sufficiently folded and then a negative ratio is not sufficiently secured, which results in deterioration of drainage performance. On the other hand, in case that the small groove 10 has an angle of more than 60 degrees, small grooves 10 in the same inclined groove 11 are excessively close to each other and then a thin portion of a land portion is formed in the tread portion 2. As a result, it is likely that stiffness cannot be sufficiently secured and then driving stability may be deteriorated. In case that two inclined grooves 11 adjacent to each other in the circumferential direction are not overlapped in the circumferential direction, a land portion not including inclined grooves 11 contacts a road surface when the tire is rolling under load, which will cause deterioration of drainage performance. In the tire 1 of this invention two inclined grooves 11 adjacent to each other in the circumferential direction are overlapped in the circumferential direction and the inclined grooves 11 are included in any widthwise section of the tire. Therefore, the inclined grooves 11 will always contact a road surface when the tire is rolling under load and it is possible to secure stable drainage performance. Thanks to such an overlap, the inclined grooves 11 don't intermittently contact the ground but always contact the ground so that the difference in stiffness is hard to occur in a region where the inclined grooves 11 are provided. As a result, it is possible to restrain vibration due to the difference in stiffness when the tire is rolling under load, to improve quiet performance and driving stability and to restrain uneven wear. By setting the inclination angle of the small groove 10 to not more than 60 degrees, the inclined groove 11 doesn't enter the ground contact surface at the same time and similarly it is possible to maintain quiet performance. Furthermore, since a part of the inclined grooves 11 is opened to the tire circumferential groove 9 (an opening part is shown in "K" in figures), water in the inclined grooves 11 flows into the tire circumferential groove 9 through the opening part and a cycle of absorption and drainage in the inclined groove 11 is promoted so that it is possible to improve drainage performance in comparison to a case where the inclined grooves 11 are not opened to the tire circumferential groove 9 at all. Furthermore, since one end of the inclined groove 11 is opened to the tire circumferential groove 9, this inclined groove 11 can function as a resonator to reduce air column resonance noise generated from the tire circumferential groove 9. A resonant frequency of air column resonance noise which can be reduced is different depending on a capacity of a resonator. Since the inclined groove 11 has a folding configuration, the inclined groove 11 can be adjusted to have an appropriate capacity so that the inclined groove 11 can function as a resonator having a capacity depending on the air column resonance noise generated from the tire circumferential groove 9. In addition, since the small groove 10 constituting the inclined groove 11 has such a shape that the width of the small groove 10 is gradually decreased towards the ends, even if a pebble and a gravel are trapped in the inclined groove 11, the trapped pebble and gravel receives a pressing force in the tire radially outer direction while the tire is rolling under load and such pebble and gravel are easy to be removed from the inclined groove 11, thereby improving stone trapping resistance. Although the small groove 10 has a curved shape as shown in FIG. 1, as long as a straight virtual line connecting both ends of the small groove 10 is inclined at an inclination angle within the above-mentioned range with respect to the tire circumferential direction, the above-mentioned various effects can be provided.

As shown in FIGS. 2 and 3, it is preferable that at least two tire circumferential grooves 9 are provided in the tread portion 2, rib-shaped land portions 15 are sectioned by these tire circumferential grooves 9, and the inclined grooves 11 are formed in the rib-shaped land portions 15. By providing the inclined grooves 11 in the rib-shaped land portions 15, it is possible to control stiffness of the rib-shaped land portions 15 and to obtain the desired performance. If the inclined groove 11 extends so as to communicate two tire circumferential grooves 9 sectioning the rib-shaped land portion 15 and is opened to the tire circumferential grooves 9, the rib-shaped land portion 15 reduces its stiffness and grooves are excessively deformed when the tire is rolling under load. Such excessive deformation of the grooves leads to decrease of the groove capacity and deterioration of drainage performance. On contrary, as in the tire 1 of this invention, by making the inclined groove 11 be partially opened to the tire circumferential groove 9, it is possible to sufficiently secure stiffness of the rib-shaped land portion 15, to restrain decrease of the groove capacity due to excessive deformation of the inclined groove 11, and to effectively secure drainage performance.

It is preferable that a mounting direction of the tire to a vehicle is designated in such a manner that the rib-shaped land portion 15 is outside of the vehicle with respect to the tire equatorial plane when the tire is mounted on the vehicle. Since a region of the tread portion outside of the vehicle with respect to the tire equatorial plane CL receives larger load during cornering, it is preferable to arrange the rib-shaped land portion 15 provided with the inclined groove 11 outside of the vehicle with respect to the tire equatorial plane CL in order to effectively improve drainage performance and driving stability during cornering. In case that a radius of curvature of the tread surface in a region which is to be the inner side of the vehicle when the tire is mounted on the vehicle is smaller than a radius of curvature of the tread surface in a region which is to be the outer side of the vehicle and the tire 1 is mounted with a negative camber, a ground contact length in a region of the tread portion 2 outside of the vehicle is decreased as the widthwise outer direction of the tire and if a lug groove having a large inclination angle with respect to the tire circumferential groove 9 is provided in this region of the tread portion 2 outside of the vehicle, pattern noise performance is deteriorated. Therefore, it is preferable to arrange the rib-shaped land portion 15 provided with the inclined groove 11 outside of the vehicle.

It is preferable that the rib-shaped land portion 15 has a width W1 of not less than 20% of a width W2 of the tread portion 2 contacting a road surface. In case that the width W1 of the rib-shaped land portion 15 is less than 20% of the width W2 of the tread portion 2 contacting a road surface, an area of the rib-shaped land portion 15 is too small and an area of the inclined groove 11 is also small even if the inclined groove 11 is formed in the rib-shaped land portion 15, whereby a groove capacity of the inclined groove 11 is not sufficiently secured and it is likely that drainage performance cannot be effectively improved.

It is preferable that the rib-shaped land portion 15 has a negative ratio within a range between 20% and 40%. In case that the negative ratio of the rib-shaped land portion 15 is more than 40%, although drainage performance is improved due to increase of a groove capacity, the rib-shaped land portion 15 excessively reduces its stiffness so that the rib-shaped land portion 15 leans to be excessively deformed and driving stability is likely to be deteriorated. On the other hand, the negative ratio of the rib-shaped land portion 15 is less than 20%, it is likely that drainage performance cannot be effectively improved for lack of a groove capacity.

It is preferable that a plurality of inclined grooves are formed and that the inclined grooves have different capacities. When the frequency range of air column resonance noise generated from the tire circumferential groove 9 spreads through a wide range, by providing the inclined groove 11 having plural capacities, the inclined grooves 11 having different capacities function as a plurality of resonators for different resonant frequencies and likely to reduce the wide range of air column resonance noise which cannot be effectively reduced by an inclined groove 11 having one kind of capacity.

It is preferable that the inclined groove 11 consists of a first small groove 12, a second small groove 13 coupled to the first end of the first small groove 12 and inclined at a smaller angle than an inclination angle of the first small groove 12 with respect to the tire circumferential direction and a third small groove 14 coupled to the second end of the first small groove 12 and inclined at a smaller angle than the inclination angle of the first small groove 12 with respect to the tire circumferential direction. In case that the inclination angles of the second small groove 13 and the third small groove 14 are larger than that of the first small groove 12, the inclined groove 11 is not sufficiently folded and a sufficient groove capacity of the inclined groove 11 cannot be secured so that drainage performance may be deteriorated and the rib-shaped land portion 15 cannot appropriately reduce its stiffness, which may cause excessively large pattern noise.

A portion of the inclined groove 11 overlapped in the circumferential direction has a length in tire circumferential direction preferably within a range between 10% and 150%, and more preferably within a range between 30% and 80% of the width W1 of the rib-shaped land portion. In case that the length in tire circumferential direction of the portion of the inclined groove 11 overlapped in the circumferential direction is more than 150% of the width W1 of the rib-shaped land portion, the rib-shaped land portion reduces its stiffness (especially in the tire widthwise direction) due to the inclined grooves 11 and driving stability may be deteriorated. On the other hand, in case that the length in tire circumferential direction of the portion of the inclined groove 11 overlapped in the circumferential direction is less than 10% of the width W1 of the rib-shaped land portion, the effect of the present invention may not be provided when the rib-shaped land portion receives a side force during handle operation to change the ground contact shape or to change the ground contact pressure distribution due to change of a road surface state.

It is noted that the above description shows only a part of embodiments of the present invention and that these constitution can be combined and various modification can be added without departing from the spirits of the present invention. For example, although generally straight small groove 10 is shown to FIGS. 1 and 2, curved small groove 10 can be provided, whose illustration is omitted. In this case, an extending direction of a straight virtual line connecting both ends of the small groove 10 is defined as an extending direction of the small groove 10 and an angle of such an extending direction with respect to the tire circumferential direction is defined as an inclination angle. In addition, as shown in FIG. 4, an opening part of the inclined groove 11 to the tire circumferential groove 9 can be changed to an arbitrary position. Furthermore, as shown in FIG. 5, the inclined groove 11 can consist of five small grooves 10.

EXAMPLE

Next, a conventional tire (Conventional Example tire 1) having a conventional tread pattern, tires (Comparative Example tires 1 to 3) having similar inclined grooves to those of the tire according to this invention and tires (Example tires 1 and 2) having the constitution of the inclined grooves according to this invention, which have the tire size of 205/55R16, are experimentally produced as a radial tire for a passenger car and evaluated for drainage performance, driving stability, uneven wear resistance and quiet performance.

Conventional Example tire 1 and Comparative Example tires 1 to 3 respectively have tread patterns shown in FIGS. 6 to 9 and parameters shown in Table 1.

Conventional Example tire 1 comprises a plurality of inclined grooves consisting of a small groove extending in the tire circumferential direction and small grooves inclined with respect to the tire circumferential direction in a rib-shaped land portion. A part of the inclined grooves is opened to a tire circumferential groove and two of the inclined grooves adjacent to each other in the circumferential direction are overlapped in the circumferential direction.

Comparative Example tire 1 comprises a plurality of inclined grooves consisting of three small grooves, one of which is inclined in the opposite direction with respect to the tire circumferential direction in a rib-shaped land portion and configured in a zig-zag manner. A part of the inclined grooves is opened to a tire circumferential groove and two of the inclined grooves adjacent to each other in the circumferential direction are not overlapped in the circumferential direction.

Comparative Example tire 2 comprises a plurality of inclined grooves consisting of three small grooves inclined at the same direction with respect to the tire circumferential direction and having an inclination angle within a range between 10 degrees and 60 degrees in a rib-shaped land portion and configured in a zig-zag manner. A part of the inclined grooves is opened to a tire circumferential groove and two of the inclined grooves adjacent to each other in the circumferential direction are not overlapped in the circumferential direction.

Comparative Example tire 3 comprises a plurality of inclined grooves consisting of three small grooves inclined at the same direction with respect to the tire circumferential direction and having an inclination angle within a range between 10 degrees and 60 degrees in a rib-shaped land portion and configured in a zig-zag manner. A part of the inclined grooves is opened to a tire circumferential groove and two of the inclined grooves adjacent to each other in the circumferential direction are formed more closely than those of Comparative Example tire 2 but not overlapped in the circumferential direction.

Figure 10:
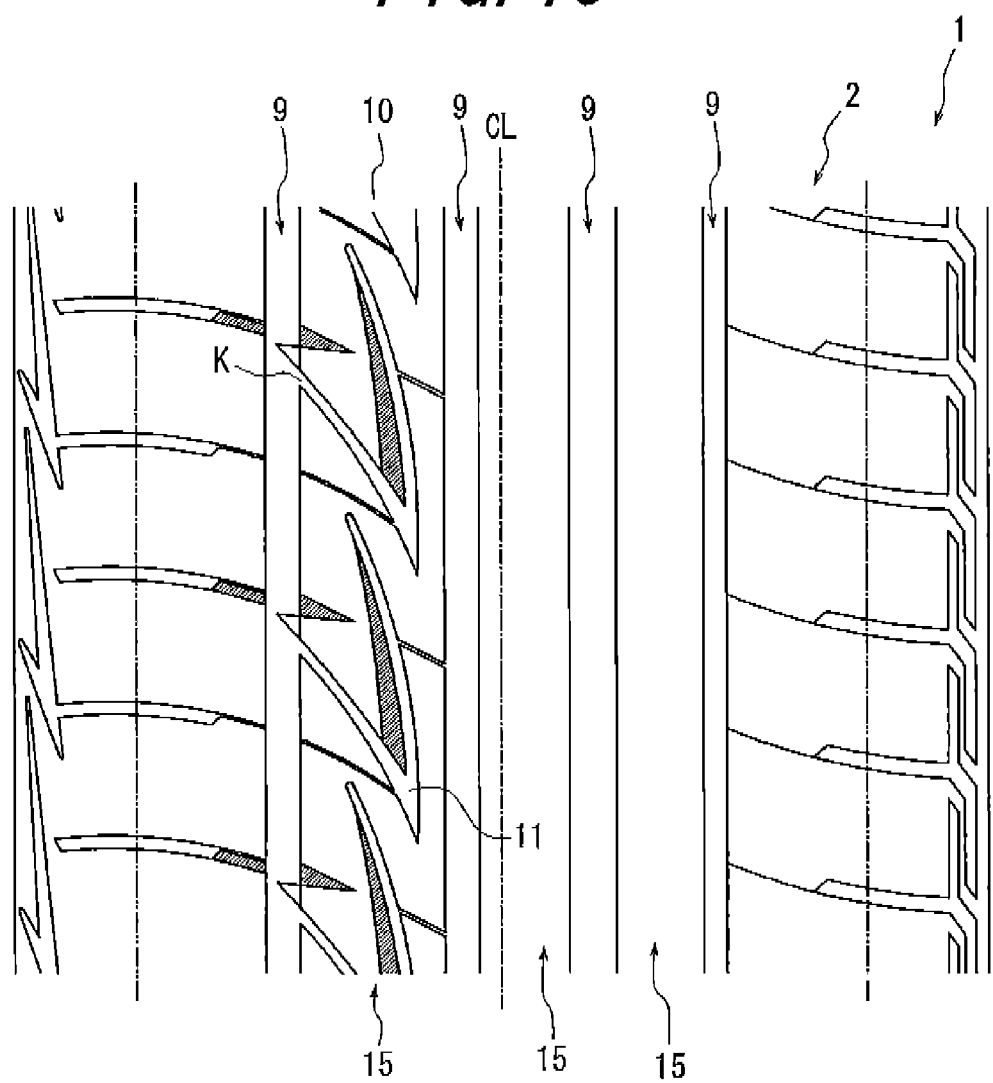
FIG. 10 is a partial development view of a tread portion of another tire according to the present invention.

Example tires 1 and 2 respectively have tread patterns shown in FIGS. 4 and 10 and parameters shown in Table 1.

Example tire 1 comprises a plurality of inclined grooves consisting of three small grooves inclined at the same direction with respect to the tire circumferential direction and having an inclination angle within a range between 10 degrees and 60 degrees in a rib-shaped land portion and configured in a zig-zag manner. A part of the inclined grooves is opened to a tire circumferential groove and two of the inclined grooves adjacent to each other in the circumferential direction are overlapped in the circumferential direction.

Example tire 2 comprises a plurality of inclined grooves consisting of two small grooves inclined at the same direction with respect to the tire circumferential direction and having an inclination angle within a range between 10 degrees and 60 degrees in a rib-shaped land portion. A part of the inclined grooves is opened to a tire circumferential groove and two of the inclined grooves adjacent to each other in the circumferential direction are overlapped in the circumferential direction.

It is noted that sipes formed in the all tires don't increase nor decrease the effect of the present invention.

TABLE 1

|  | Presence of inclined groove in any widthwise section of tire | Width of rib-shaped land portion to contacting width to road surface [%] | Length of overlap in tire circumferential direction/width of rib-shaped land portion [%] | Inclination angle of first small groove [deg.] | Inclination angle of second small groove [deg.] | Inclination angle of third small groove [deg.] | Negative ratio [%] |
|---|---|---|---|---|---|---|---|
| Conventional Example tire 1 | Yes but with swallow lap | 20 | 27 | 45 | 0 | 10~25 | 22 |
| Comparative Example tire 1 | No | 20 | 0 | (−40 to −60) | 10 to 20 | 40 to 50 | 16 |
| Comparative Example tire 2 | No | 20 | 0 | 30 to 45 | 10 to 20 | 40 to 50 | 15 |
| Comparative Example tire 3 | No | 20 | 0 | 30 to 45 | 10 to 20 | 40 to 50 | 22 |
| Example tire 1 | Yes | 20 | 55 | 30 to 45 | 10 to 20 | 40 to 50 | 22 |
| Example tire 2 | Yes | 20 | 37.5 | 35 | 12 | — | 20 | is opened to a tire circumferential groove and two of the inclined grooves adjacent to each other in the circumferential direction are not overlapped in the circumferential direction.

Each of these test tires is mounted on a rim having the size 6.5×16 J to form a tire wheel and thus-formed tire wheel is attached to a vehicle for various evaluation under the condition that air pressure is 230 kPa (relative pressure), load of a front tire is 4.0 kN and load of a rear tire is 3.1 kN.

Drainage performance is evaluated in such a manner that a professional driver drives the above-mentioned vehicle on a wet circuit road with the water depth of 10 mm to generate a hydroplaning phenomenon and the speed when the hydroplaning phenomenon is generated is compared. The value of drainage performance of Conventional Example tire 1 is converted to 100 and other tires are relatively evaluated. The larger value means the better drainage performance and the evaluation results are shown in Table 2.

Driving stability is evaluated based on a professional driver's feeling in such a manner that he drives the above-mentioned vehicle at a speed of 60 km/h to 180 km/h on a dry circuit road with a dry road surface. The value of driving stability of Conventional Example tire 1 is converted to 6 and other tires are relatively evaluated. The larger value means the better driving stability and the evaluation results are shown in Table 2.

Quiet performance is evaluated based on a professional driver's feeling in such a manner that he drives the above-mentioned vehicle at a speed of 60 km/h to 120 km/h on a circuit road. The value of quiet performance of Conventional Example tire 1 is converted to 100 and other tires are relatively evaluated. The larger value means the better quiet performance and the evaluation results are shown in Table 2.

Uneven wear resistance is evaluated in such a manner that a professional driver drives the above-mentioned vehicle on a general road for 10,000 km and then the wear amount due to heel and toe wear in a block land portion is compared. The smaller wear amount means the better uneven wear resistance and the evaluation results are shown in Table 2.

TABLE 2

| | Drainage performance | Driving stability | Quiet performance | Wear amount |
|---|---|---|---|---|
| Conventional Example tire 1 | 100 | 6 | 6 | 1.0 mm |
| Comparative Example tire 1 | 90 | 6 | 6 | 1.2 mm |
| Comparative Example tire 2 | 90 | 6 | 5 | 1.2 mm |
| Comparative Example tire 3 | 105 | 6 | 6 | 1.0 mm |
| Example tire 1 | 105 | 7 | 7 | 0.8 mm |
| Example tire 2 | 105 | 7 | 7 | 0.8 mm |

As is apparent from the results of Table 2, Comparative Example tire 1 shows similar driving stability and quiet performance and inferior uneven wear resistance and drainage performance in comparison to those of Conventional Example tire 1 as a standard. In addition, Comparative Example tire 2 shows similar driving stability and inferior quiet performance, uneven wear resistance and drainage performance. In contrast, Example tires 1 and 2 show effectively improved driving stability, drainage performance, uneven wear resistance and quiet performance.

INDUSTRIAL APPLICABILITY

As is apparent from the above description, according to the present invention, it is possible to provide a pneumatic tire sufficiently improving drainage performance, driving stability, uneven wear resistance and quiet performance.

The invention claimed is:

1. A pneumatic tire comprising:
   a tread portion provided with at least two tire circumferential grooves extending along a tire circumferential direction and sectioning a rib-shaped land portion; and
   a plurality of inclined grooves formed in the rib-shaped land portion, consisting of two or more small grooves inclined at a same direction with respect to the tire circumferential direction and having an inclination angle within a range between 10 degrees and 60 degrees formed in a surface of the tread portion and configured in a zig-zag manner by coupling ends of the small grooves;
   wherein two of the inclined grooves adjacent to each other in the circumferential direction are partially overlapped in the circumferential direction,
   the inclined grooves include an opening part so that only one end of the inclined groove is opened to one of the tire circumferential grooves and the other end of the inclined groove terminates in the rib-shaped land portion or communicates to one of the circumferential grooves via a sipe, and
   the tire circumferential grooves do not communicate with each other via the inclined grooves.

2. The pneumatic tire according to claim 1, wherein a mounting direction of the tire to a vehicle is designated in such a manner that the rib-shaped land portion is outside of the vehicle with respect to a tire equatorial plane when the tire is mounted on the vehicle.

3. The pneumatic tire according to claim 1, wherein the rib-shaped land portion has a width of not less than 20% of a width of the tread portion contacting a road surface.

4. The pneumatic tire according to claim 1, wherein the rib-shaped land portion has a negative ratio within a range between 20% and 40%.

5. The pneumatic tire according to claim 1, wherein the inclined grooves having different capacities are formed.

6. The pneumatic tire according to claim 1, wherein the inclined groove consists of:
   a first small groove;
   a second small groove coupled to a first end of the first small groove and inclined at a smaller angle than an inclination angle of the first small groove with respect to the tire circumferential direction; and
   a third small groove coupled to a second end of the first small groove and inclined at a smaller angle than the inclination angle of the first small groove with respect to the tire circumferential direction.

7. The pneumatic tire according to claim 1, wherein a portion of the inclined groove overlapped in the circumferential direction has a length in tire circumferential direction within a range between 10% and 150% of a width of the rib-shaped land portion.

* * * * *